P. HACKETT.
Grain-Drill.
No. 68,563.
Patented Sept. 3, 1867.
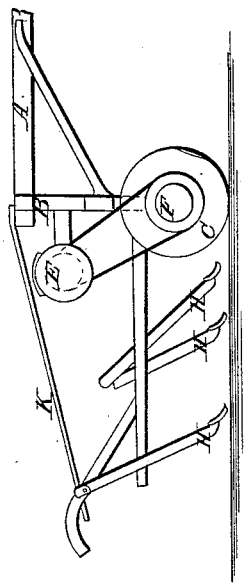
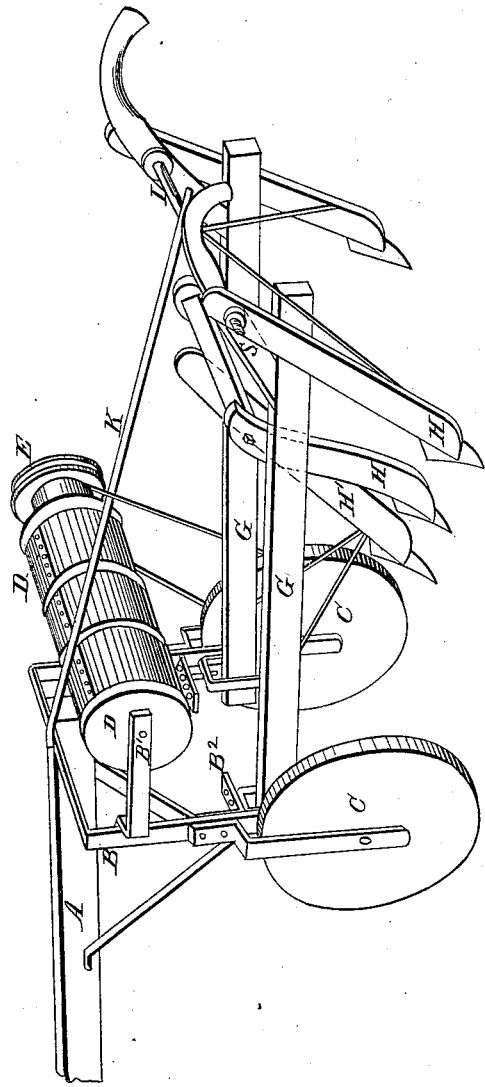
Witnesses
Chas F. Clausen
D. P. Holloway
Inventor
Patrick Hackett
by D P Holloway & Co
his attys

United States Patent Office.

PATRICK HACKETT, OF NEW GENESEE, ILLINOIS.

Letters Patent No. 68,563, dated September 3, 1867.

---

IMPROVEMENT IN SEED-SOWER AND CORN-PLOUGH.

---

The Schedule referred to in these Letters Patent and making part of the same.

---

TO ALL WHOM IT MAY CONCERN:

Be it known that I, PATRICK HACKETT, of New Genesee, in the county of Whitesides, and State of Illinois, have invented a new and useful Improvement in Combined Seed-Sowers, Corn-Plough, and Cultivators; and I do hereby declare that the following is a full, clear, and exact description of the same, reference being had to the annexed drawings, in which—

Figure 1 is a perspective view, and

Figure 2 is a side elevation.

The same letters are employed in all the figures in the indication of identical parts.

The machine is intended to be drawn by two horses attached to the tongue A. The tongue is fastened to the frame B, which rests upon the two wheels C C, placed at such a distance apart as to run on each side of a row of corn. Arms B' are fastened to the frame B, supporting the journals of a cylindrical case, D, which is constructed with an opening, closed by a door, through which the seed intended to be sown may be introduced into the seeder. Rows of holes, of a diameter sufficient to allow the escape of small grain, are cut through the shell of the seeder. These rows of holes are covered by the slides D', which are perforated with holes of the same size as those in the shell of the seeder, and at the same distance apart, and are held in place by bands passing around the seeder. These slides are intended to regulate the escape of the seed or entirely to prevent the same. The seeder is caused to revolve by a band passing over pulleys on the end of the seeder-shaft and on the axle of one of the wheels. These pulleys are formed by cones so that the speed of the revolution of the seeder may be regulated as required. The beams of the ploughs G are attached to the arms $B^2$ of the frame B by eyes, the stems supporting which pass through holes in the arms $B^2$. There are several of these holes in each of the arms $B^2$, so that the space between the ploughs may be regulated as required. The standards H supporting the shovels are attached to the beams in such manner as to permit their being used as cultivators, or as corn-ploughs. When used for ploughing corn the middle plough H' must be removed, which may be done easily, as the beams are united by the rod I, fastened by the nut S. K is a rod attached to the tongue or frame B, and extending back over the plough. This rod has a hook at the hinder end, which being fastened on the rod I, will hold the ploughs above the ground when required.

What I claim as my invention, and desire to secure by Letters Patent, is—

1. The combination of the seeding-cylinder D and the fixed plough H, and removable plough H', so that the machine may be used for seeding, cultivating, or ploughing corn, substantially as described.

2. The combination of the frame B with arms $B^2$, beams G, and shovels, standards H and H', and rod I, arranged substantially as set forth.

3. The combination of the tongue A, frame B, and ploughs, with the rod I, constructed and arranged to operate substantially as described.

4. The combination of the wheels C, pulleys E and F, and seeding-cylinder D, constructed with adjustable slides D', and arranged to operate substantially as set forth.

In testimony whereof I have signed my name to this specification in the presence of two subscribing witnesses.

P. HACKETT.

Witnesses:
D. S. SPAFFORD,
P. BRODERICK.